Nov. 12, 1968
J. A. WATKINS
3,411,154
DETENTING APPARATUS FOR ELECTROMAGNETIC
INDICATOR WHEEL STRUCTURE
Filed Sept. 8, 1966
4 Sheets-Sheet 1
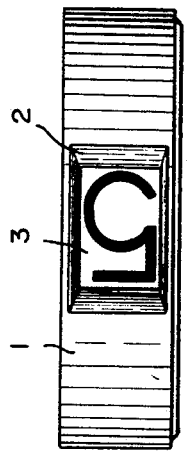
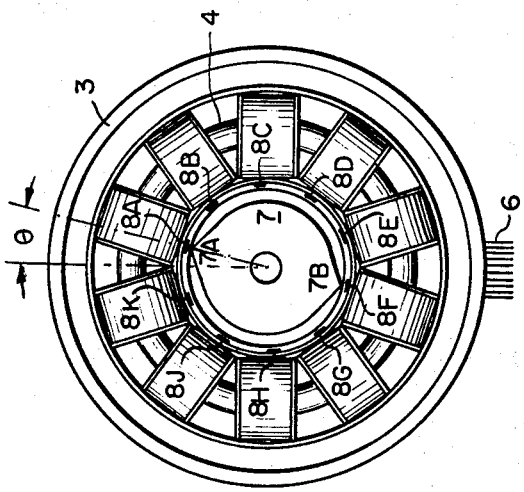
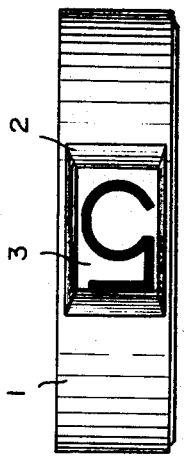
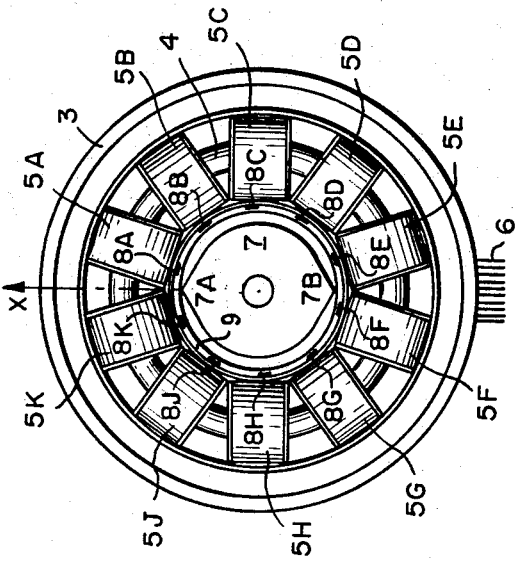
INVENTOR.
JOHN A. WATKINS
BY
Weingarten, Ovenbuch, & Lahive
ATTORNEYS Nov. 12, 1968   J. A. WATKINS   3,411,154
DETENTING APPARATUS FOR ELECTROMAGNETIC
INDICATOR WHEEL STRUCTURE
Filed Sept. 8, 1966   4 Sheets-Sheet 2

INVENTOR.
JOHN A. WATKINS
BY
*Weingarten, Oronbuch & Lahive*
ATTORNEYS

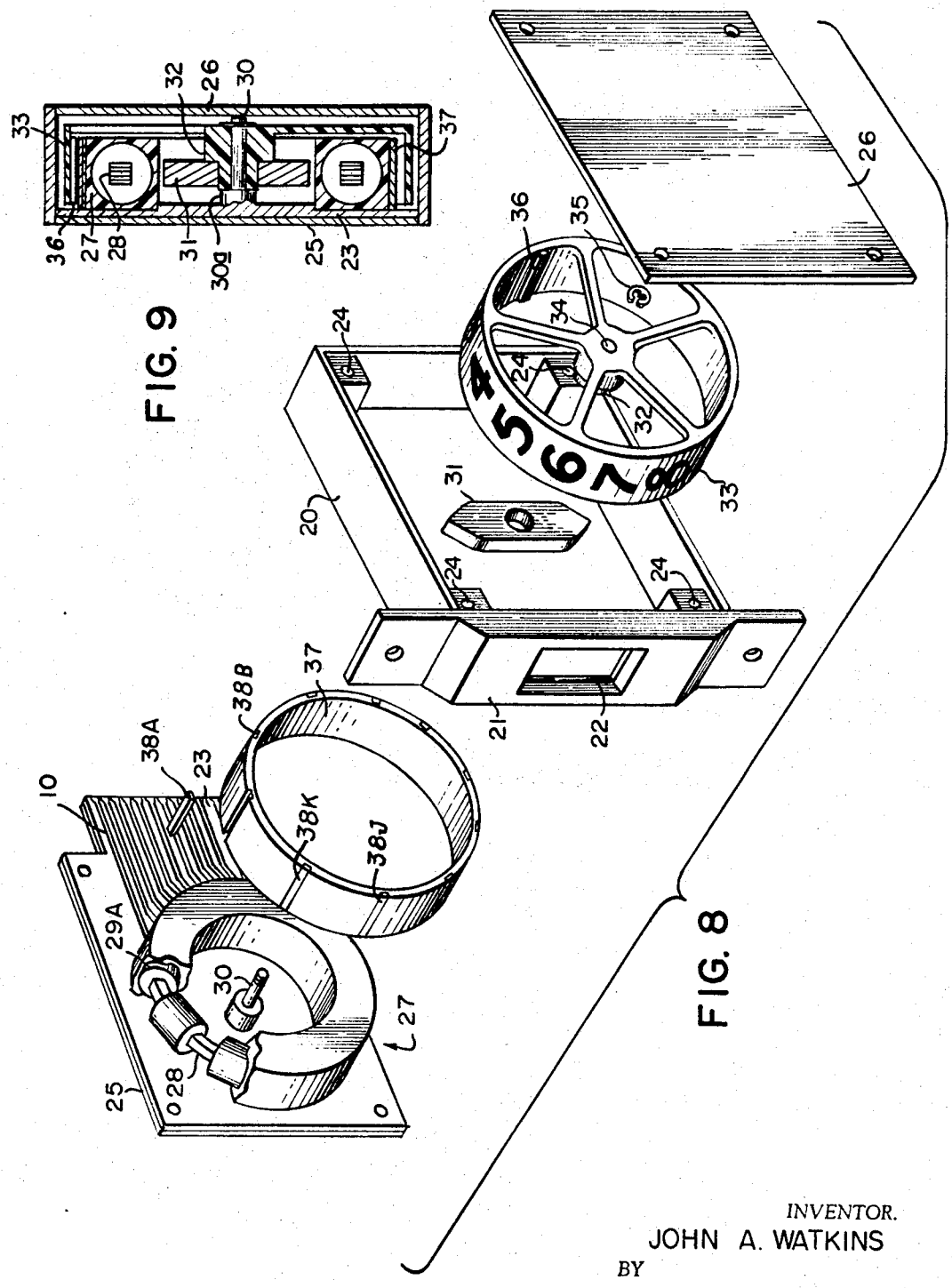

Nov. 12, 1968
J. A. WATKINS
3,411,154
DETENTING APPARATUS FOR ELECTROMAGNETIC
INDICATOR WHEEL STRUCTURE
Filed Sept. 8, 1966
4 Sheets-Sheet 4
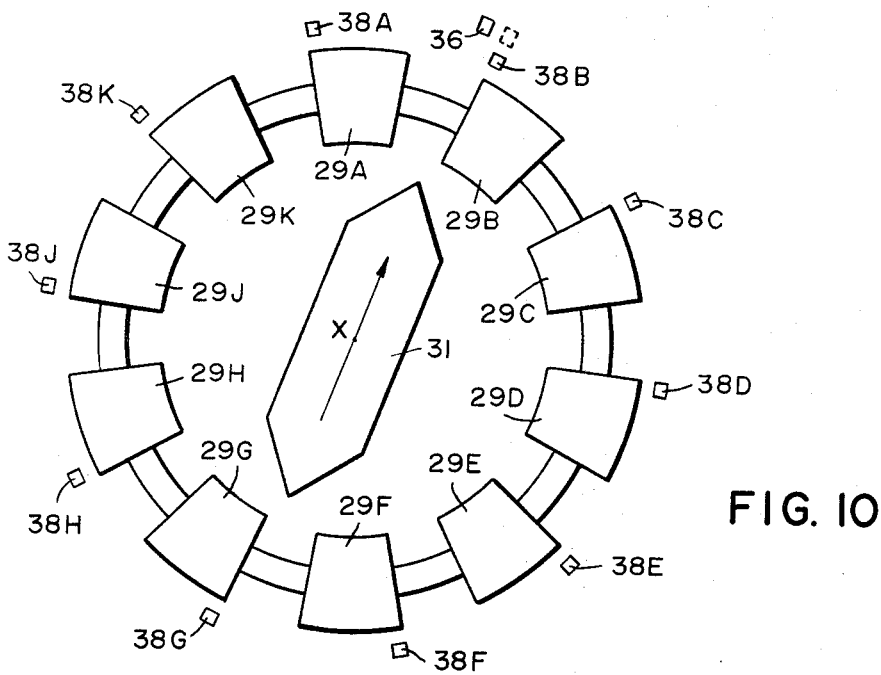
FIG. 10
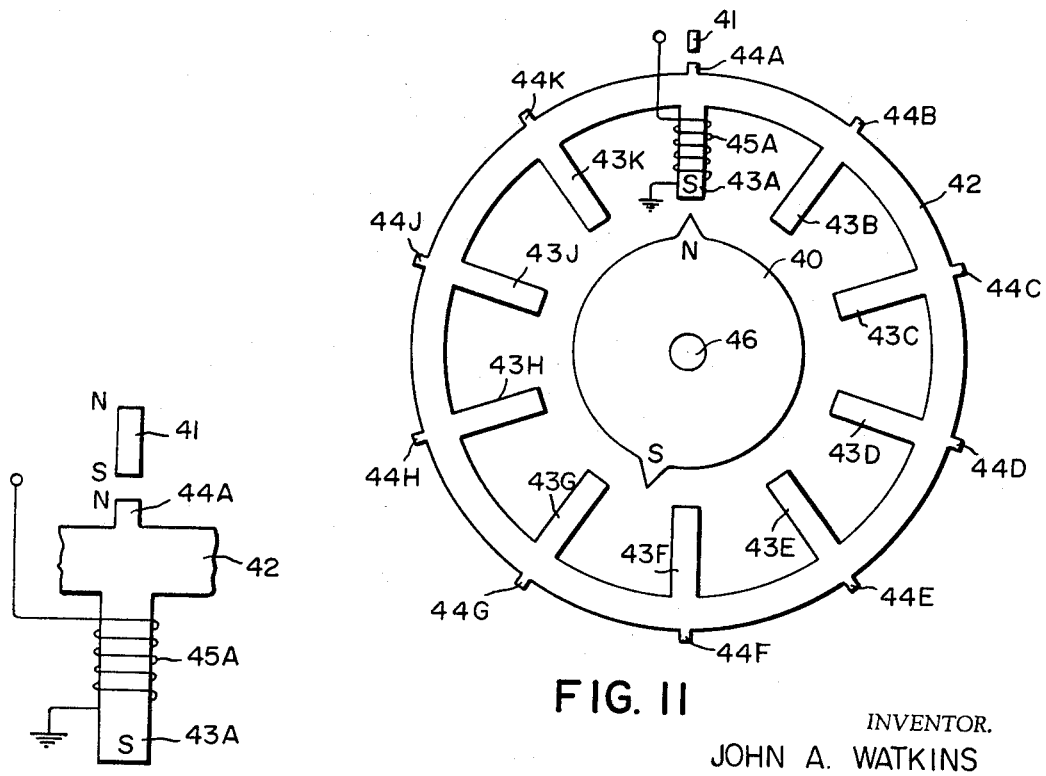
FIG. 11
FIG. 12
INVENTOR.
JOHN A. WATKINS
BY
Weingarten, Orenbuch & Sahive
ATTORNEYS

United States Patent Office 3,411,154
Patented Nov. 12, 1968

3,411,154
DETENTING APPARATUS FOR ELECTROMAGNETIC INDICATOR WHEEL STRUCTURE
John A. Watkins, Cheshire, Conn., assignor, by mesne assignments, to United-Carr Incorporated, Boston, Mass., a corporation of Delaware
Filed Sept. 8, 1966, Ser. No. 577,929
3 Claims. (Cl. 340—378)

This invention relates in general to indicators of the type having a window in which can be displayed symbols which are carried upon a rotatable drum. More particularly, the invention pertains to "memory" apparatus for holding the drum in a precisely fixed position to cause a symbol to be exactly registered in the display window.

The invention is an improvement over the electromagnetic indicator disclosed in U.S. Patent No. 2,943,313 granted to Gordon et al. on June 28, 1960. The Gordon patent concerns an indicator employing a stator having an annular ferromagnetic core upon which a plurality of windings are mounted. The windings, when electrically energized, cause the stator to establish a discretely oriented magnetic field. Under the influence of the magnetic field, a rotor having a number wheel fastened to a permanent magnet rotates to align the magnet with the stator's magnetic field. Upon the stator's windings being electrically deenergized, the permanent magnet of the rotor is attracted by magnetizable detent elements to a position slightly offset from the position the magnet had when it was aligned with the field of the stator. In the offset position, a number on the wheel is registered in the window of Gordon's indicator. The magnetizable elements employed in Gordon's indicator are arrayed in space between the rotor's permanent magnet and the stator. For each symbol on the wheel, the stator, when electrically energized, is able to establish a magnetic field of discrete orientation and the magnetizable elements provide an equal number of offset positions to "lock" the wheel in a fixed position when the stator is electrically deenergized. The accuracy with which any number on the wheel is centered in the window of the indicator, when the stator is electrically unenergized, ideally is governed by the force of attraction between the rotor's permanent magnet and the magnetizable detent elements. The magnetizable elements used by Gordon provide his indicator with a "memory," because when the indicator is electrically deenergized, the number last displayed in the window remains in view until the indicator is commanded to display another number. In addition the magnetizable elements are used by Gordon to pull the rotor to an offset position when the stator is deenergized so that when the stator is again energized the rotor is never required to turn a diametrically (i.e. 180°) opposite position.

In the manufacture of electromagnetic indicators employing magnetizable detent elements arranged in the manner disclosed in the Gordon patent, difficulties have been encountered in centering the numbers of other symbols in the indicator's window. It is, consequently, an objective of the invention to provide "memory" apparatus for an electromagnetic indicator which causes the symbols displayed by the indicator to be accurately registered in the display window.

The invention resides in placing magnetizable detent elements in a circular array that surrounds the stator and in employing a "register" magnet on the number wheel in a position where the register magnet is carried around a path in close proximity to the detent elements. In this arrangement the magnetizable detent elements and the register magnet are outside the stator so that the detent elements and the register magnet are not appreciably affected by the magnetic field of the stator or by the magnetic field of the rotor's permanent magnet.

The invention, both as to its construction and its mode of operation, can be comprehended from the following exposition when it is considered in conjunction with the accompanying drawings in which:

FIG. 1 illustrates the interior of an indicator employing a conventional arrangement of magnetizable detents and depicts the rotor in its field aligned position;

FIG. 2 illustrates the position of the symbol in the indicator's window when the rotor is aligned with a magnetic field established by the electrically energized stator;

FIG. 3 shows the indicator of FIG. 1 with the rotor in its detent aligned position;

FIG. 4 depicts the centered position of the symbol in the indicator's window when the rotor is aligned with a detent;

FIG. 8 is an exploded view of an embodiment of the invention;

FIG. 9 is a cross-sectional view showing the assembled embodiment of FIG. 8;

FIG. 10 depicts the scheme of the invention as used in the FIG. 8 embodiment;

FIG. 11 shows the invention embodied in a radial pole indicator using a rotor employing a "bent" magnet; and FIG. 12 is an enlargement of a segment of FIG. 11.

Figure 5:
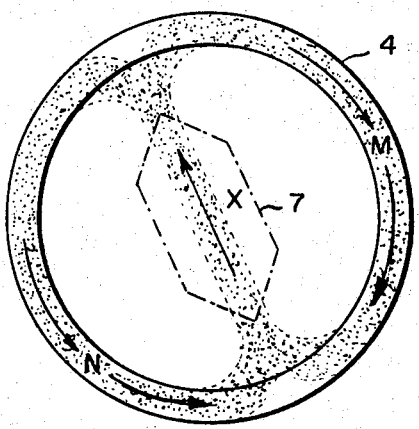
FIG. 5 depicts the magnetic field established by the electrically energized stator.

Referring now to FIGS. 1 and 3, there is depicted the interior of an electromagnetic indicator of the "toroidal" type shown in Gordon's U.S. Patent No. 2,943,313. That indicator employs, as shown in FIGS. 2 and 4, a housing 1 having a window 2 in which a numeral on a drum 3 can be displayed. When the numeral is centered in the window as depicted in FIG. 4, the symbol is said to be "registered" in the window. Within the housing of the indicator is located a toroidal stator having an annular ferromagnetic core 4 upon which a plurality of windings 5A, 5B, 5C, . . . 5K are mounted. Wires 6, extending through an aperture in the housing permit those windings to be electrically energized. Upon applying electrical excitation to the windings, the current flowing in the windings causes the stator to establish a magnetic field whose field pattern is indicated in FIG. 5. The electrically energized windings cause part of the magnetic flux to flow clockwise as indicated by the M arrows in FIG. 5 and cause an equal part of the magnetic flux to flow counterclockwise as indicated by the N arrows. Because of the directions of the flux flow, the magnetic flux is forced out of the core 4. The external magnetic field can be represented by a vector X whose direction is the direction of the external field and whose length is a measure of the external field's magnetic intensity. In the absence of any other external magnetic field, a rotatable permanent magnet 7 positioned as indicated in phantom in FIG. 5, is constrained to rotate into alignment with the X vector.

In the indicator shown in FIGS. 1 and 3, the drum 3 has a permanent magnet 7 attached to it. The drum and magnet form a rotor that is mounted to permit magnet 7 to turn within the space enclosed by the stator. The permanent magnet 7 is shaped to provide pointed ends which help to concentrate the magnetic flux of the magnet at sharply defined North and South magnetic poles. The pointed ends constitute "salient" poles 7A and 7B of the magnet in the sense that the magnetic field is most intense in the immediate vicinity of two diametrically opposite points on the magnet.

Disposed in a circular array around rotor magnet 7 are a plurality of magnetizable detent elements 8A, 8B, 8C, ... 8K. The magnetizable detents are soft iron bars that fit within slots in a non-magnetic cylindrical shell 9.

Assuming that the windings of the stator are electrically energized to cause the stator to establish a magnetic field represented by the vector X in FIG. 1, the magnet 7 is constrained to rotate into alignment with that magnetic field and assume the position shown in that drawing. In the vector aligned position a number on the drum appears, as shown in FIG. 2, in an off-centered position in the window of the indicator. Upon electrical deenergization of the stator's windings, the magnetic field established by the stator collapses. The salient poles 7A and 7B of the rotor magnet are then attracted toward the adjacent magnetizable detents 8A and 8F and cause the rotor to move through an angle $\theta$ to an "offset" position. In the offset position, the drum 3 is stationed so that the number is registered in the window of the indicator as depicted in FIG. 4.

Figure 6:
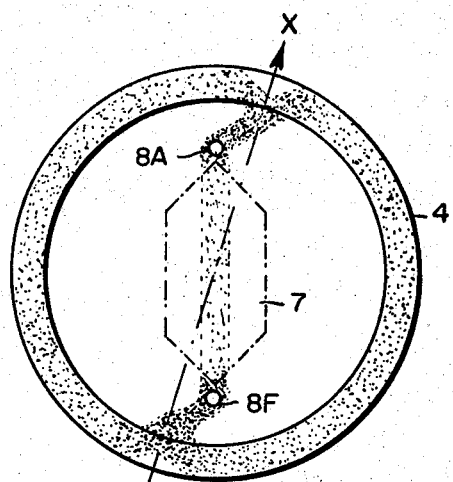
FIG. 6 illustrates the distortion introduced by magnetizable detents located within the enclosure of the stator.

Difficulties have been encountered in the indicator when it was commanded to have the rotor move to a new position adjacent to its "offset" position. Consider, for example, FIG. 6 where the rotor's permanent magnet 7 is initially aligned in an "offset" position with the detents 8A and 8F, and the stator is electrically energized to command the rotor to move to the adjacent position represented by the X vector. In the absence of magnetizable detents within the enclosure of the stator, the magnetic field established by the electrically energized stator would have the direction of vector X and the rotor would move to align itself with that vector. Because of the presence of detents 8A and 8F, however, the magentic field established by the electrically energized stator tends to be distorted by the magnetizable detents and follows the path indicated by the stippling in FIG. 6. The effect of the distortion introduced in the field by the detents, is to hold the rotor in its "offset" position when it should have moved into alignment with the X vector.

Figure 7:
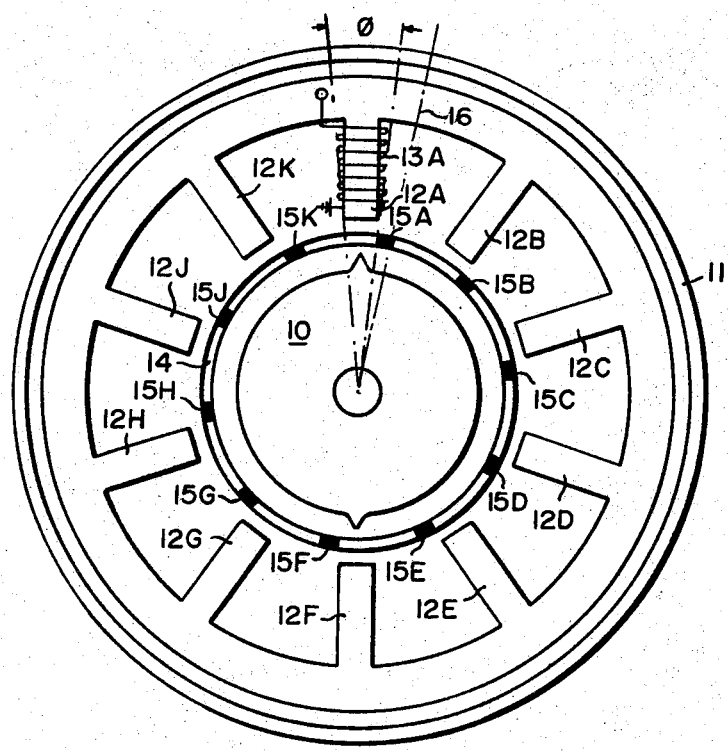
FIG. 7 depicts the scheme of a radial pole indicator employing a conventional arrangement of magnetizable detents.

FIG. 7 illustrates an electromagnetic indicator of the radial pole type utilizing the magnetizable detent elements of Gordon to provide "memory" and "offset." The rotor of the indicator has a salient pole permanent magnet 10 secured to a drum 11 which carries upon its periphery the numbers or other symbols to be displayed in the indicator's window. The stator of the indicator has a ferromagnetic annular core from which poles 12A, 12B, ... 12K protrude radially inwardly. In the conventional radial pole indicator there is one radial pole for each number or symbol on the drum. In FIG. 7, for purposes of clarity, only radial pole 12A is depicted as carrying a winding 13A, but it should be understood that similar windings are carried by all the other radial poles. By energizing a winding on a selected radial pole, the number or symbol corresponding to that radial pole is brought into view in the indicator's window. Interposed in the space between the rotor's permanent magnet 10 and the stator is a non-magnetic ring 14 having an array of magnetizable detent elements 15A, 15B, 15C, ... 15K. When a winding of the stator is electrically energized, the magnetic field established by the stator causes the rotor to turn and align the permanent magnet 10 with the radial pole carrying the energized winding. In the field aligned position, the salient poles of the permanent magnet are substantially in line with that radial pole. This, however, permits the permanent magnet to come to rest anywhere over a relatively broad sector 46. Upon deenergization of the winding, the stator's magnetic field collapses and the attraction of the magnetizable elements for the permanent magnet 10 is intended to cause the rotor to be pulled to a position, indicated by the line 16, where the rotor is angularly offset from the radial pole with which it was formerly aligned.

Each magnetizable detent element 15A, 15B, 15C, ... 15K is necessarily located close to a radial pole to insure attracting the adjacent salient pole of the permanent magnet when the stator is electrically deenergized. Where the indicator is of smal size, the magnetizable elements become crowded together so that a salient pole of the permanent magnet may, for example, be attracted in FIG. 7 to the magnetizable detent element 15K instead of to the magnetizable detent element 15A and cause an incorrect display.

The detenting force in the radial pole type of indicator tends to be weak because the radial pole itself attracts the adjacent end of the permanent magnet in competition with the attractive force of the magnetizable detent element. Shock or vibration of the indicator may overcome the weak detenting force and cause the rotor to shift its position and joggle the number displayed in the window.

In the manufacture of the toroidal and the radial pole type of indicator, it was found that the spatial arrangement of the detent pins in many indicators had to be individually adjusted to obtain proper registration of the symbols in the window. The adjustments were in part made necessary by variations in the permanent magnets employed in the rotors. In the conventional indicator, the permanent magnet of the rotor is required to have two sharply defined diametrically opposed magnetic poles. Because of variations in the permanent magnets, the magnets did not line up with the detent pins in exactly the same position and relocation of the detent pins was necessary to insure that proper registration of each symbol in the indicator's window was obtained. Adjustment of the detent pins proved to be a delicate and time-consuming operation that represented a substantial part of the total direct labor needed to construct each indicator.

In addition to the foregoing considerations, the presence of the magnetizable elements in the space enclosed by the stator introduces factors that are detrimental to exact regisration of the symbols. The magneizable elements are composed of a material that is "soft," viz, of a material that is highly permeable to magnetic flux. The magnetizable material, however, exhibits some degree of magnetic remanence. Therefore, though the detent elements are physically symmetrical around the inside of the stator, they are not magnetically symmetrical after the stator has been energized. Each time the stator is electrically energized, the detents are magnetized by the stator's field and upon deenergization of the stator, the detents retain some magnetization. The magnetic history of the detents determines to some extent, the position taken by the rotor in the absence of a stator field. While the effect may not be great and may not be present in every instance, it can occasionally prevent the symbol from being centered in the window of the indicator.

An exploded view of an electromagnetic indicator embodying the invention is shown in FIG. 8. The indicator employs a housing 20 having a front panel 21 containing a window 22 in which symbols are displayed. Electrical signals are impressed upon the stator of the indicator through the terminals of a printed circuit board 23 that extends from the rear of the indicator housing. The housing employs a hollow rectangular body having internally threaded apertures 24 at its corners to permit end plates 25 and 26 to be secured to opposite sides of the housing by screws which engage the threads in the holes. Printed circuit board 23 has its wiring protected by an insulative coating and the board is preferably clamped against the housing by end plate 25. As several indicators may be mounted side by side or may be used in an environment where external magnetic fields of appreciable strength are present, the end plates 25 and 26 are, preferably, fabricated of a material of high magnetic permeability to act as magnetic shields.

Secured to circuit board 23 is a stator 27 employing an annular ferromagnetic core 28 carrying a plurality of windings 29A, 29B, 29C, ... 29K which can be electrically energized through the terminals of the printed circuit boards. To aid in heat dissipation and to fix the windings upon the ferromagnetic core, the windings are embedded in a synthetic resin. A shaft 30, secured to printed circuit board 23, extends through the geometric center of the annular ferromagnetic core. In the assembled apparatus, depicted in FIG. 9, a rotor is mounted to turn about the shaft 30. The rotor has a salient pole magnet 31 attached to the hub 32 of a drum 33 so that the magnet and drum rotate as a unit. On the periphery of the drum are marked the symbols that are to be displayed in the window 22 of the indicator. Usually, the symbols are alphanumeric characters and are of a size permitting only one character at a time to be fully presented in the window. For the purpose of this exposition, the symbols marked on the drum's periphery are the ten decimal numerals 0, 1, 2, . . . 9. The hub 32 of the drum has a central aperture 34 which permits the hub to be mounted over shaft 30. To retain the rotor so that it cannot slip off the shaft, a groove is provided near the shaft's end for accommodating a C-shaped lock member 35. The shaft has an enlarged portion 30a, best shown in FIG. 9, which provides a shoulder against which hub 32 bears to position the rotor so that the permanent magnet is aligned with the core 28. Within the drum 33 is secured a permanent magnet 36 which is termed the "register" magnet because it effects registration of the symbol in the window of the indicator when the stator is deenergized.

Around the stator 27 is disposed a non-magnetic ring 37 carrying a circular array of magnetizable detents 38A, 38B, etc. Each detent, preferably, is a bar of soft iron or other material of high magnetic permeability. When the rotor is mounted on shaft 30, the drum encircles the ring 37 whereas the magnet is within the enclosure of the annular stator. Upon rotation of the rotor, the register magnet is swept around a path close to the circular array of magnetizable detents. Each magnetizable detent is arranged to pull the rotor to an offset position relative to the position the rotor takes when it is aligned with a magnetic field established by the electrically excited stator.

In FIG. 10, the arrangement of the magnetizable detents 38A, 38B, 38C, . . . 38K relative to the stator windings 29A, 29B, 29C, . . . 29K is schematically shown. Assuming the stator's windings are electrically energized to establish a magnetic field represented by vector X, the rotor turns to align its permanent magnet 31 with that vector. In the vector aligned position, the register magnet 36 is adjacent to, but slightly angularly displaced from detent 38B and the symbol on the rotor's drum is situated in an uncentered position in the window of the indicator, in the manner depicted in FIG. 2. The register magnet is attracted toward adjacent detent 38B, but cannot move closer to it because permanent magnet 31 is constrained by the stator's field to remain in the vector aligned position. Upon electrical deenergization of the stator's winding, the magnetic field established by the stator collapses. The attraction between the register magnet and the adjacent magnetizable detent then causes the rotor to move and the register magnet takes the station shown by broken lines in FIG. 10. When the register magnet is in that station, the symbol on the drum is centered in the indicator's window in the manner illustrated in FIG. 4. Each detent 38A, 38B, 38C, . . . 38K is associated with a different symbol on the drum and causes its symbol to be centered in the indicator's window when the stator is electrically unenergized. The detents and the register magnet, therefore, provide "memory" and "offset" for the the indicator. Because the detents are located outside the stator's enclosure, the detents are not materially affected by the magnetic fields established by the stator. The detenting action is obtained through the attraction between the register magnet and its adjacent detent and does not depend upon the permanent magnet 31 of the rotor. In fact, the magnetizable detents 38A, 38B, 38C, . . . 38K are shielded by the ferromagnetic core 28 from the magnetic field of permanent magnet 31. If greater detenting force is desired, more than one register magnet may be mounted upon the drum, provided the detents 38A, 38B, 38C, . . . 38K are spaced at equal intervals around the annular stator.

FIG. 11 depicts an embodiment of the invention in which the rotor's permanent magnet 40 provides "coarse" centering of the symbol in the window of the indicator and the register magnet 41 carried by the drum provides "fine" centering of that symbol. The indicator employs a stator having an annular ferromagnetic core 42 from which radial poles 43A, 43B, 43C, . . . 43K protrude inwardly and from which detents 44A, 44B, 44C, . . . 44K protrude radially outwardly. The permanent magnet 40 is so-called "bent" magnet because its North and South magnetic poles are not on a straight line passing through the pivotal axis 46 of the rotor. Instead, the North and South magnetic poles of magnet 40 are arranged so that when the North pole of the magnet is aligned with a radial pole of the stator, the South pole of magnet 40 is stationed between two radial poles of the stator.

Each radial pole 43A, 43B, 43C, . . . 43K carries a winding, such as winding 45A, which can be electrically energized to cause the stator to establish a magnetic field. If, for example, winding 45A is electrically excited to cause the end of radial pole 43A to be a South magnetic pole, the rotor of the indicator turns to align the North pole of magnet 40 with radial pole 43A. Because of the breadth of the tip of radial pole 43A, and for other reasons, the alignment tends to be imprecise. In this coarsely aligned position, the register magnet 41 on the rotor's drum is in the vicinity of detent 44A. Detent 44A is, in effect an outwardly protruding small radial pole and is therefore a North magnet pole when the tip of radial pole 43A is a South magnetic pole. As depicted in FIG. 12, which is an enlarged segment of FIG. 11, register magnet 41 is disposed to have its South magnetic pole nearer to the periphery of ferromagnetic core 42 and, hence, the South magnetic pole of magnet 41 is juxtaposed to detent 44A. The attraction between the register magnet and detent 44A then causes the rotor to move and bring the register magnet into alignment with the adjacent detent. In that finely aligned position, the rotor's drum is stationed so that the symbol is centered in the indicator's window. Thus, when the stator is electrically energized, the rotor turns to a position where the symbol commanded to be displayed is registered in the indicator's window.

When the electrical signals to the stator terminate, the stator's magnetic field collapses. The displayed symbol, however remains in its registered position in the window unitl the indicator is commanded to display a different symbol. The display symbol is held in registered position through the combined action of the rotor's permanent magnet 40 and register magnet 41. With winding 45A unenergized, the adjacent North pole of permanent magnet 40, in FIGS. 11 and 12, induces a South pole at the tip of radial pole 43A and causes detent 44A to be an induced North magnetic pole. That induced North magnetic pole attracts the adjacent South pole of register magnet 41 and the magnetic force of attraction holds register magnet 41 in its detent aligned station. The detents 44A, 44B, 44C, . . . 44K and register magnet 41 thereby act as a "memory" for the indicator and eliminate the "blinks" associated with indicators of the FIG. 1 type.

In view of the multitude of ways in which the invention can be embodied, it is not intended that the scope of the invention be restricted to the precise structures illustrated in the drawings or described in the exposition. In the embodiment illustrated in FIG. 8, for example, it is obvious that ring 37 can be eliminated and that the magnetizable detents can be directly positioned upon the periphery of the annular stator. It is also evident that the magnetizable detents can, alternatively, be secured to the interior wall of housing 20. The invention further contemplates embodiments in which the positions of the register magnet and the magnetizable detents are interchanged. That is, embodiments in which the magnetizable detent are fastened to the drum of the rotor and the register magnet is fixed in position are within the purview of this invention. The use of more than one register magnet in the same indicator to provide greater detenting action is also deemed to be within the purview of the invention. Because of the many forms that the invention can take, it is intended that the scope of the invention be delimited by the appended claims and that within that scope be included only those structure which in essence utilize the invention.

What is claimed is:

1. In a symbol display device of the type utilizing:
   (1) a panel having a window;
   (2) a stator for selectively establishing any one of a plurality of discretely oriented magnetic fields, the stator having an annular ferromagnetic core; and
   (3) a rotor having a permanent magnet attached to a drum, the drum having a plurality of symbols marked upon its periphery, the drum being situated to present its symbols in the window of the panel, the magnet being encircled by the stator's core and the stator's core being encircled by the drum, the rotor being mounted to permit the magnet to rotate into alignment with the discretely oriented magnetic field established by the stator;

the improvement comprising
   (a) a plurality of magnetizable detent elements arranged in a circular array surrounding the annular ferromagnetic core of the stator, and
   (b) a register magnet affixed to the drum and positioned to travel in a circular path outside the annular core and close to the circular array of detent elements, the register magnet being attracted by the adjacent magnetized detent element to a station where a symbol is registered in the window of the panel.

2. The improvement according to claim 1, wherein the magnetizable detent elements are radial protrusions extending from the ferromagnetic core.

3. In a symbol display device of the type utilizing:
   (1) a panel having a window in which symbols are displayed;
   (2) a stator employing an annular ferromagnetic core having inwardly protruding radial poles upon which electrically energizable windings are disposed; and
   (3) a rotor having a permanent magnet attached to a drum, the drum having symbols marked upon it and being situated to present the symbols in the window of the panel, the magnet being encircled by the stator's core and the stator's core being encircled by the drum, the rotor being mounted to permit the magnet to rotate in response to the magnetic field established by electrical energization of the stator;

the improvement comprising
   (a) a plurality of detents extending outwardly from the stator's annular ferromagnetic core and forming a circular array around the core, and
   (b) a register magnet affixed to the drum and positioned to travel in a circular path outside the annular core and close to the circular array of detents, the register magnet being attracted, when juxtaposed to a detent, to a station where a symbol on the drum is registered in the window of the indicator.

No references cited.

JOHN W. CALDWELL, *Primary Examiner.*

H. PITTS, *Assistant Examiner.*